US007792603B2

(12) United States Patent
Hioki

(10) Patent No.: US 7,792,603 B2
(45) Date of Patent: Sep. 7, 2010

(54) PROGRAM AND METHOD FOR GENERATING APPROXIMATE CURVE FROM APPROXIMATE POINT GROUP DATA

(75) Inventor: Katsuya Hioki, Aichi (JP)

(73) Assignee: Okuma Corporation, Aichi (JP)

( * ) Notice: Subject to any disclaimer, the term of this patent is extended or adjusted under 35 U.S.C. 154(b) by 384 days.

(21) Appl. No.: 11/832,047

(22) Filed: Aug. 1, 2007

(65) Prior Publication Data

US 2008/0033699 A1 Feb. 7, 2008

(30) Foreign Application Priority Data

Aug. 4, 2006 (JP) .............................. 2006-212753

(51) Int. Cl.
*G06F 19/00* (2006.01)
*G06F 17/50* (2006.01)
(52) U.S. Cl. .............................. 700/187; 703/2; 700/97; 700/188
(58) Field of Classification Search ................... 700/97, 700/187, 188; 703/2; 345/342
See application file for complete search history.

(56) References Cited

U.S. PATENT DOCUMENTS

| 3,806,713 | A | * | 4/1974 | Ryberg ...................... 318/573 |
| 4,423,481 | A | * | 12/1983 | Reid-Green et al. ......... 700/189 |
| 5,115,479 | A | * | 5/1992 | Murayama .................. 382/241 |
| 5,140,236 | A | | 8/1992 | Kawamura et al. |
| 5,410,645 | A | * | 4/1995 | Ooka et al. ................. 345/442 |
| 5,726,896 | A | * | 3/1998 | Jia et al. ..................... 700/187 |
| 5,936,864 | A | * | 8/1999 | Otsuki et al. ............... 700/188 |
| 5,966,469 | A | * | 10/1999 | Moon et al. ................. 382/241 |
| 6,167,325 | A | * | 12/2000 | Kamiguchi et al. ......... 700/183 |
| 6,401,004 | B1 | * | 6/2002 | Yamazaki et al. ........... 700/159 |
| 6,675,061 | B2 | * | 1/2004 | Hirai et al. .................. 700/189 |
| 6,728,595 | B2 | * | 4/2004 | Hamamura et al. ......... 700/188 |

(Continued)

FOREIGN PATENT DOCUMENTS

JP        2113305        4/1990

(Continued)

OTHER PUBLICATIONS

Mizias et al., "Shape Recognition with a Neural Classifier based on the Fast Polygon Approximation". 1994. CSA Illumina, p. 627-636.*

(Continued)

*Primary Examiner*—Albert DeCady
*Assistant Examiner*—Thomas H Stevens
(74) *Attorney, Agent, or Firm*—Gauthier & Connors LLP

(57) ABSTRACT

An approximate curve generation method according to the present invention generates an approximate curve as smooth as an original curve from point group data obtained by approximating a curve shape, and includes: an approximate polygon shape range determining step of sectioning point group data for each line segment of an approximate polygon shape which is generated when the point group data approximating the curve shape are obtained, and sorting the point group data close to a section boundary as valid point group data, and the point group data inside the valid point group data as invalid point group data; and an approximate curve generating step of regarding only the valid point group data, and generating an approximate curve passing through or close to the regarded valid point group data as an approximate curve to be finally obtained.

11 Claims, 10 Drawing Sheets

U.S. PATENT DOCUMENTS

| | | | |
|---|---|---|---|
| 6,823,234 B2 | 11/2004 | Otsuki et al. | |
| 2007/0085850 A1* | 4/2007 | Hong et al. | 345/442 |
| 2007/0091094 A1* | 4/2007 | Hong et al. | 345/474 |

FOREIGN PATENT DOCUMENTS

| | | |
|---|---|---|
| JP | 10240328 | 9/1998 |
| JP | 2003337607 | 11/2003 |
| JP | 2004078516 | 3/2004 |

OTHER PUBLICATIONS

Chen et al., "Efficient Algorithms for Orthoganal Polygon Approximation". 1996, IEEE p. 779-782.*

Giesen-J.,"Curve Reconstruction in Arbitrary Dimension and the Traveling Salesman Problem", 1999, Springer-Verlag, p. 164-176.*

Yin-P.Y., "A New Method for Polygonal Approxiamtion Using Genetic Algorithms", 1998, Elsevier Science, p. 1017-1026.*

* cited by examiner

PROGRAM AND METHOD FOR GENERATING APPROXIMATE CURVE FROM APPROXIMATE POINT GROUP DATA

CROSS-REFERENCE TO RELATED APPLICATIONS

This application claims priority to Japanese Patent Application No. 2006-212753 filed on Aug. 4, 2006, which is incorporated herein by reference in its entirety.

BACKGROUND OF THE INVENTION

1. Field of the Invention

The present invention relates to a program and method for generating an approximate curve as smooth as an original curve from point group data approximating the original curve shape by minute line segments.

2. Description of the Related Art

Curved surfaces of an object such as a mold are machined by means of drive shafts of a machine etc. controlled by an NC (numerical control) apparatus to which is input an NC program, which is generated on the basis of point group data generated by means of an apparatus for CAD/CAM, etc. With regard to this process, there is a method developed to generate a smooth approximate curve from point group data approximated by minute line segments, in which interpolation is performed along the approximate curve to process the curved surface in order to maintain the accuracy and the quality of a work surface and shorten a working time.

The point group data approximated by minute line segments to the original curve shape, such as transfer command data provided to each drive shaft of a machine, can be generated as follows by means of an apparatus for CAD/CAM, etc.

First, an offset shape Ko expanded outward by the radius of a tool used in an apparatus for the CAM in processing for a target shape Kj generated by an apparatus for CAD etc. is formed from approximate data of, for example, a polygon Kp obtained by combining minute planes as shown in FIG. 4 within a specified allowance.

Furthermore, the sectional line of the approximate offset shape Kp is approximated by further minute line segments (L) along the travel path of the tool when the process is performed in the apparatus for CAM etc., such that a command mode directed by the NC apparatus can be attained, and is represented by point group data ($p_i$ etc.).

However, for the following reason, there may arise a case where some of the point group data ($p_i$ etc.) indicating the approximate sectional line L fail to represent an ideal offset shape Ko obtained by expanding the shape by the radius of the tool, as shown in FIG. 5.

For example, such a case arises when one plane of a polygon Kp having an approximate offset shape is large, and exceeds a maximum distance of the thinning range specified when data are thinned into finally generated point group data.

In a further example situation, when the curved surface data for similar shapes are smoothly connected on the surface boundary line formed in the middle of the curved surface data of both shapes, a part of the point group data remaining after not being thinned when the point group data are finally generated is not located in an ideal offset shape Ko, due to the data being at a specific position on the shape data or the data belonging to another group.

Furthermore, the above-mentioned case may arise when an apparatus generates point group data without thinning when an allowance is considered only when a polygon Kp in an approximate offset shape is generated when final point group data ($p_i$ etc.) are generated from an ideal offset shape Ko, and the approximation is performed by the subsequent minute line segments.

Therefore, in the conventional method in which it is assumed that any piece of point group data $P_i$ is located within an allowance evenly from an ideal offset shape Ko, the displacement from the ideal offset shape Ko changes depending on the position, and an approximate curve and a correction curve for interpolation can be generated such that a specified allowance can be exceeded in some cases. Therefore, the curvature and smoothness of the ideal offset shape Ko are lost, and as a result a streak or a distortion may be generated on a worked surface.

Especially, although a specified allowance is reduced to raise the position accuracy and the density of the point group data is increased to correspond to the work of higher accuracy, the amount of data of the polygon Kp indicating the approximate offset shape increases by a power of two or more. Therefore, the apparatus for the CAM etc. cannot accommodate this, and there may arise a case where each surface of the polygon Kp cannot be as minute as expected. In this case, the point group data close to the ideal offset shape Ko cannot be generated as expected although the processing time consumed by the apparatus for CAM and the amount of generated data increases while only the rate of the point group data located on each plane of the polygon Kp increases, thereby failing to achieve efficiency.

SUMMARY OF THE INVENTION

The approximate curve generation method according to the present invention is a method of generating an approximate curve as smooth as the original curve from the point group data as transfer command data in an NC program used in an NC apparatus for controlling transfer of each drive axis of a machine, the point group data being obtained by approximating a curve shape as the original transfer shape by minute line segments. The method includes: an approximate polygon shape range determining step of sectioning the point group data for each line segment of the approximate polygon shape which is generated when the point group data approximating the curve shape are obtained, and sorting the point group data close to a section boundary as valid point group data, and the point group data inside the valid point group data as invalid point group data; and an approximate curve generating step of regarding only the valid point group data, and generating an approximate curve passing through or close to the regarded valid point group data as an approximate curve to be finally obtained.

DESCRIPTION OF THE PREFERRED EMBODIMENTS

The embodiments of the present invention are described below with reference to the flowcharts of FIGS. 1 to 3 and the explanatory views of FIGS. 5 to 9. In the following descriptions, when similar processes are employed, the detailed descriptions of the second and subsequent processes are omitted.

An example purpose of the embodiments of the present invention described below is to provide an approximate curve generation method of generating a curve closer to an ideal offset shape Ko by generating an approximate curve and a correction curve after selecting in advance only actually valid point group data when generating the approximate curve, for which the transfer target positions of a drive axis are actually interpolated, or the correction curve for use in the process of generating the approximate curve.

Figure 1:
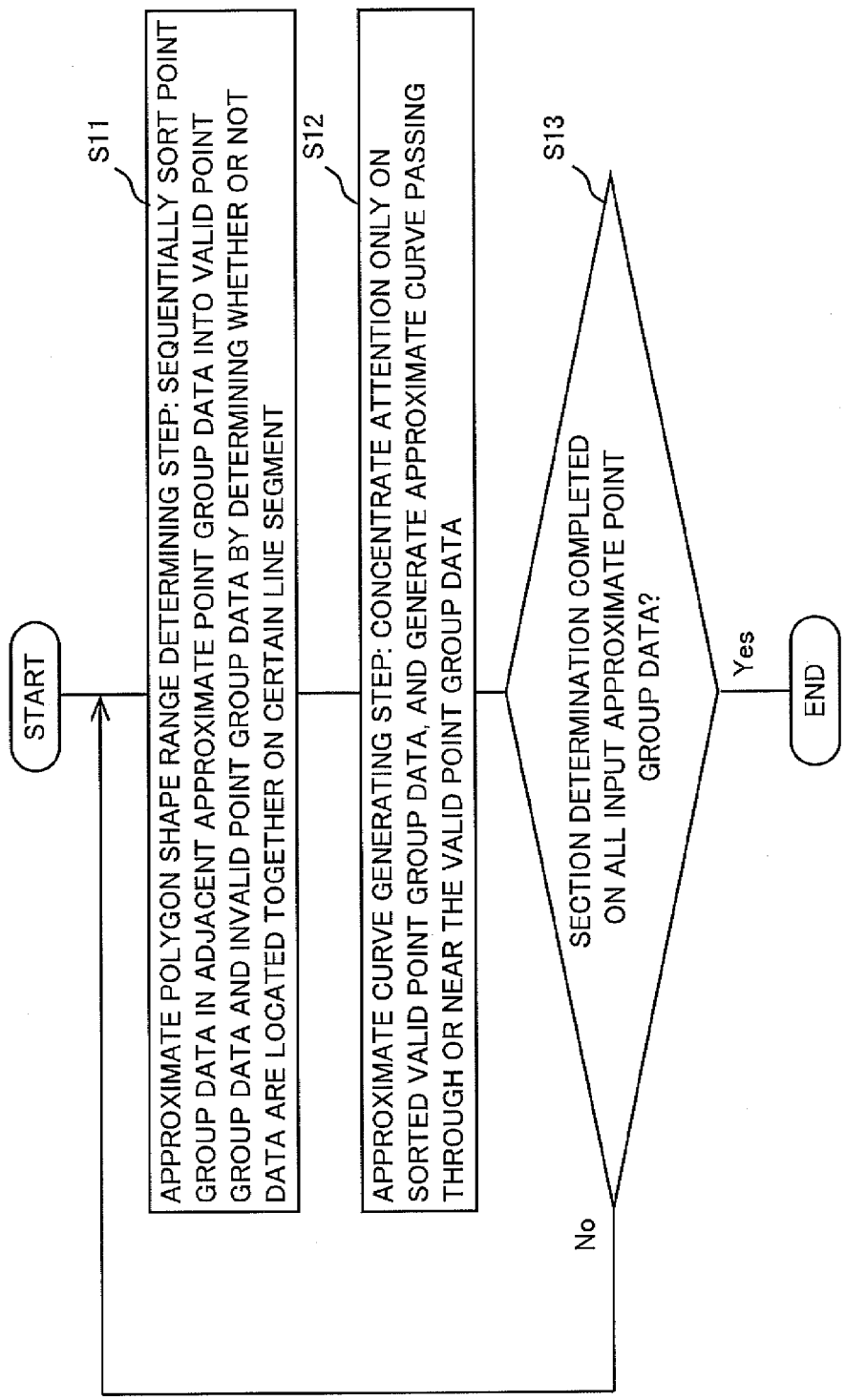
FIG. 1 is a flowchart of the operation of a first embodiment of the present invention.

FIG. 1 is a flowchart of an approximate curve generation method from the approximate point group data according to an embodiment of the present invention. The approximate curve generation method from approximate point group data according to the present invention includes an approximate polygon shape range determining step S11 and an approximate curve generating step S12.

In the approximate polygon shape range determining step S11, input point group data are sequentially sectioned by determining whether or not, in the point group data approximating the original curve shape, the adjacent data ..., $P_{i-1}$, $P_i$, $P_{i+1}$, ... are located together on the line segment having an approximate polygonal shape generated when the point group data are obtained, the point group data close to the section boundary are sorted as valid point group data, and the point group data inside the valid point group data are sorted as invalid point group data.

In the approximate curve generating step S12, only the valid point group data sorted in the approximate polygon shape range determining step S11 are regarded, and an approximate curve passing through or close to the valid point group data is generated in a spline curve interpolation method, a least square method approximation method, etc. as in the conventional art.

Finally, a determination is made as to whether or not the section determination is completed on all input point group data. If data remain to be section-determined, processing returns to the approximate polygon shape range determining step S11, and the determination is repeated again. If all input point group data are completely section-determined, the series of processes terminates (S13).

Figure 2:
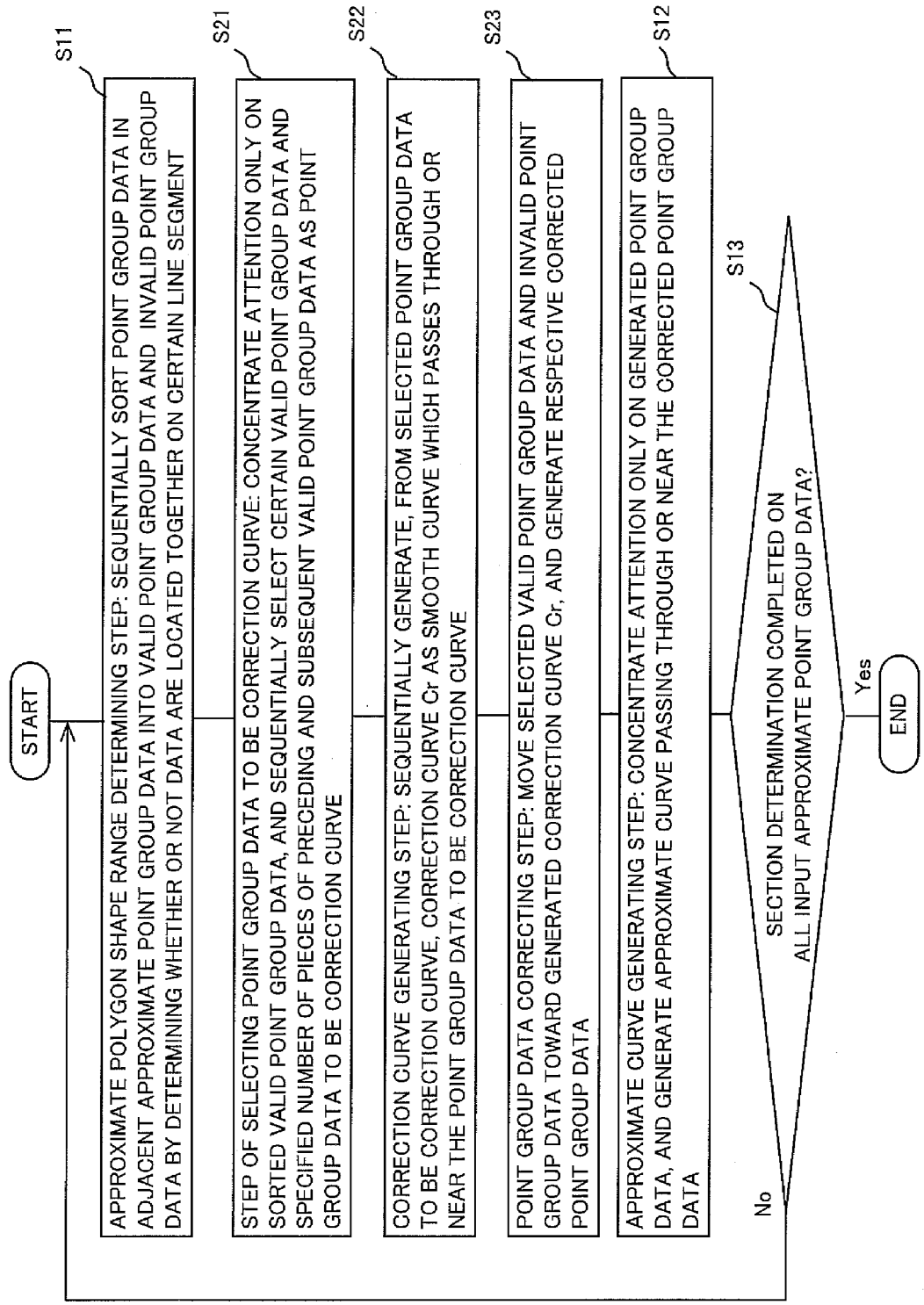
FIG. 2 is a flowchart of the operation of a second embodiment of the present invention.

FIG. 2 is a flowchart of an approximate curve generation method from the approximate point group data according to another embodiment of the present invention. The approximate curve generation method from the approximate point group data according to the present invention includes the approximate polygon shape range determining step S11, a step S21 of selecting point group data to be a correction curve, a correction curve generating step S22, a point group data correcting step S23, and the approximate curve generating step S12.

First, in the approximate polygon shape range determining step S11, a determination is made as to whether or not there exist, in the point group data approximated to the original curve shape, the adjacent data ..., $P_{i-1}$, $P_i$, $P_{i+1}$, ... located together on the line segment having an approximate polygonal shape generated when the point group data are obtained, thereby sequentially sectioning the input point group data, and then the point group data close to the section boundary are sorted as valid point group data, and the point group data inside the valid point group data are sorted as invalid point group data.

Figure 5:
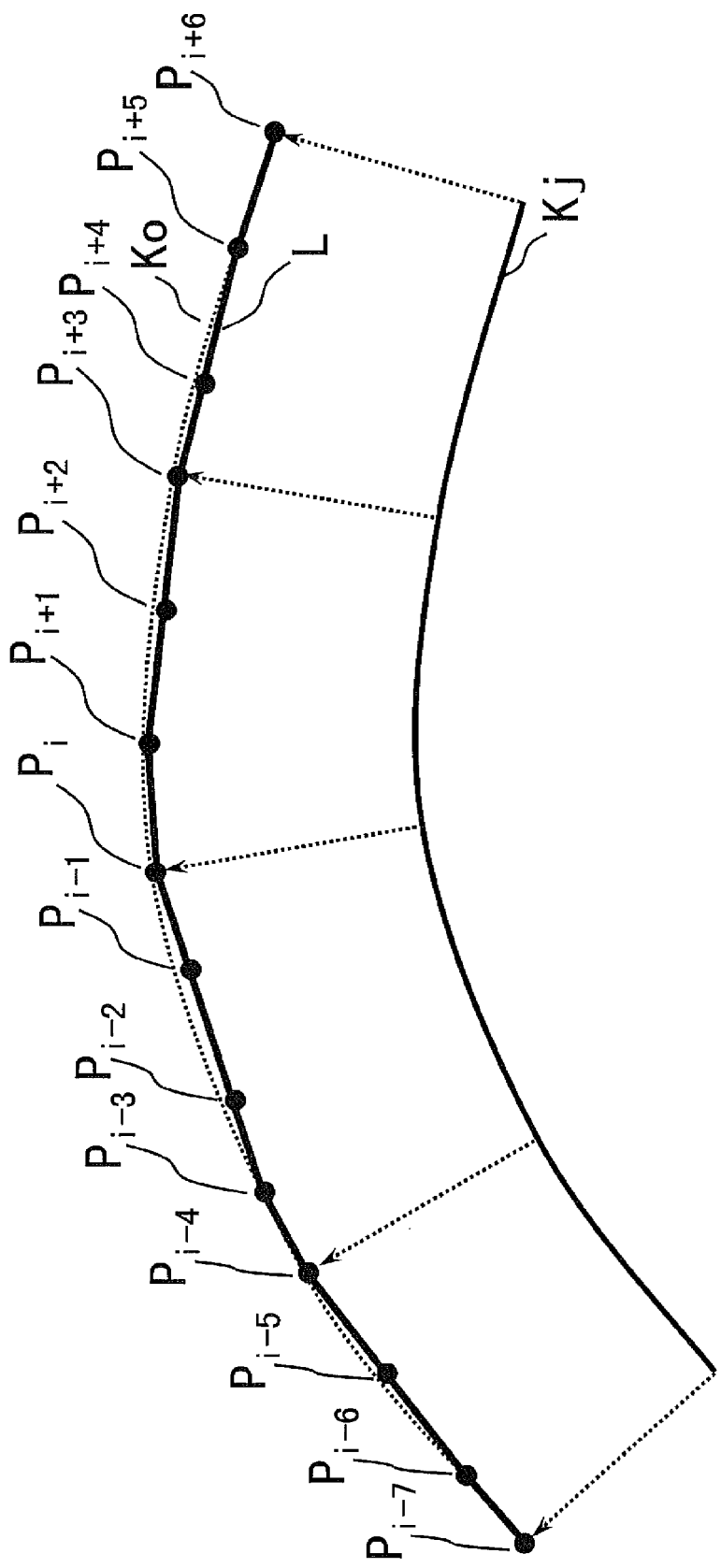
FIG. 5 is an explanatory view of an example of the problem to be solved by the present invention.

For example, in the example shown in FIG. 5, the respective sections can be $P_{i-6}$ to $P_{i-4}$, $P_{i-4}$ to $P_{i-3}$, $P_{i-3}$ to $P_i$, $P_i$ to $P_{i+1}$, $P_{i+1}$ to $P_{i+3}$, etc., wherein the data $P_{i-6}$, $P_{i-4}$, $P_{i-3}$, $P_i$, $P_{i+1}$, $P_{i+3}$ close to the section boundary are selected as valid point group data, and the data $P_{i-5}$, $P_{i-2}$, $P_{i-1}$, $P_{i+2}$, etc. in between the valid point group data are selected as invalid point group data.

Next, in the step S21 of selecting point group data to be a correction curve, only the valid point group data sorted in the approximate polygon shape range determining step S11 are regarded, and the regarded valid point group data and a specified number of pieces of valid point group data before and after the regarded data are sequentially selected as point group data to be a correction curve.

For example, in the example shown in FIG. 5, if regarded valid point group data are data $P_{i-3}$, and the specified numbers of pieces of data before and after the regarded data are 2 and 3, then the data $P_{i-6}$, $P_{i-4}$, $P_{i-3}$, $P_i$, $P_{i+1}$, $P_{i+3}$ are selected as point group data to be a correction curve.

In the correction curve generating step S22, from the point group data to be a correction curve selected in the step S21 of selecting point group data to be a correction curve, a smooth correction curve Cr passing through or close to the point group data to be a correction curve is sequentially generated.

In the point group data correcting step S23, the valid point group data sorted in the approximate polygon shape range determining step S11 and each piece of invalid point group data surrounded by the valid point group data is moved toward the correction curve Cr generated in the correction curve generating step S22, and the respective corrected point group data are generated.

Figure 6:
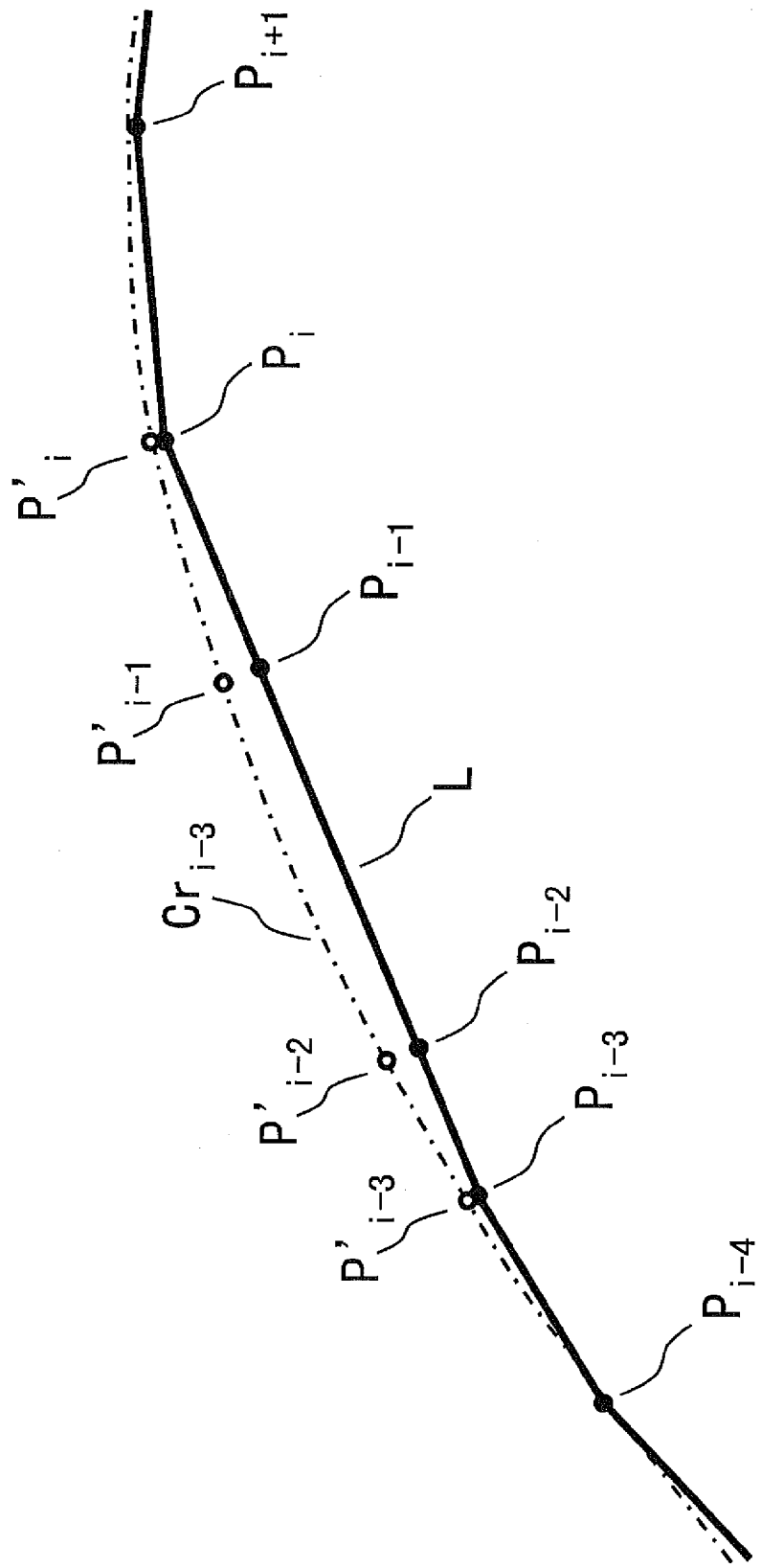
FIG. 6 is an explanatory view of the operation in the point group data correcting step according to the second embodiment of the present invention.

For example, in the section in the approximate polygon shape range from $P_{i-3}$ to $P_i$ shown in FIG. 5, as shown in FIG. 6 in which the section is enlarged, toward the correction curve $Cr_{i-3}$ generated from the point group data to be a correction curve $P_{i-6}$, $P_{i-4}$, $P_{i-3}$, $P_i$, $P_{i+1}$, $P_{i+3}$ selected in step S21 of selecting point group data to be a correction curve, the valid point group data $P_{i-3}$ and $P_i$ in the section are moved in the shortest direction or in the direction perpendicular to the line segment $P_{i-3}$ to $P_i$, and corrected point group data $P'_{i-3}$ and $P'_i$ are generated. The invalid point group data $P_{i-2}$ and $P_{i-1}$ in the section are similarly moved toward the correction curve $Cr_{i-3}$, thereby generating corrected point group data $P'_{i-2}$ and $P'_{i-1}$.

Then, in the approximate curve generating step S12, only the corrected point group data generated in the point group data correcting step S23 are regarded, and an approximate curve passing through or close to the corrected point group data is generated in a manner similar to the conventional art.

Finally, a determination is made as to whether or not the section determination is completely performed on all input point group data. If data remain to be section-determined, processing is returned to the approximate polygon shape range determining step S11, and the determination is repeated again. If all input point group data are completely section-determined, the series of processes terminates (S13).

As described above with reference to FIG. 2, the approximate curve generation method according to an aspect of the present invention includes: an approximate polygon shape range determining step of sectioning point group data for each line segment of an approximate polygonal shape which is generated when the point group data approximating the original curve shape are obtained, and sorting the point group data close to a section boundary as valid point group data and the point group data inside the valid point group data as invalid point group data; a step of selecting point group data to be a correction curve, regarding only the valid point group data, selecting a piece of the regarded valid point group data and a specified number of pieces of the valid point group data before and after the piece of the regarded valid point group data as the point group data to be the correction curve; a correction curve generating step of generating a smooth correction curve passing through or close to the selected point group data to be the correction curve; a point group data correcting step of moving the valid point group data sorted in the approximate polygon shape range determining step and each piece of the invalid point group data surrounded by the valid point group data toward the correction curve, and defining the moved data as corrected point group data; and an approximate curve generating step of generating an approximate curve passing through or close to the corrected point group data as an approximate curve to be finally obtained.

Figure 3:
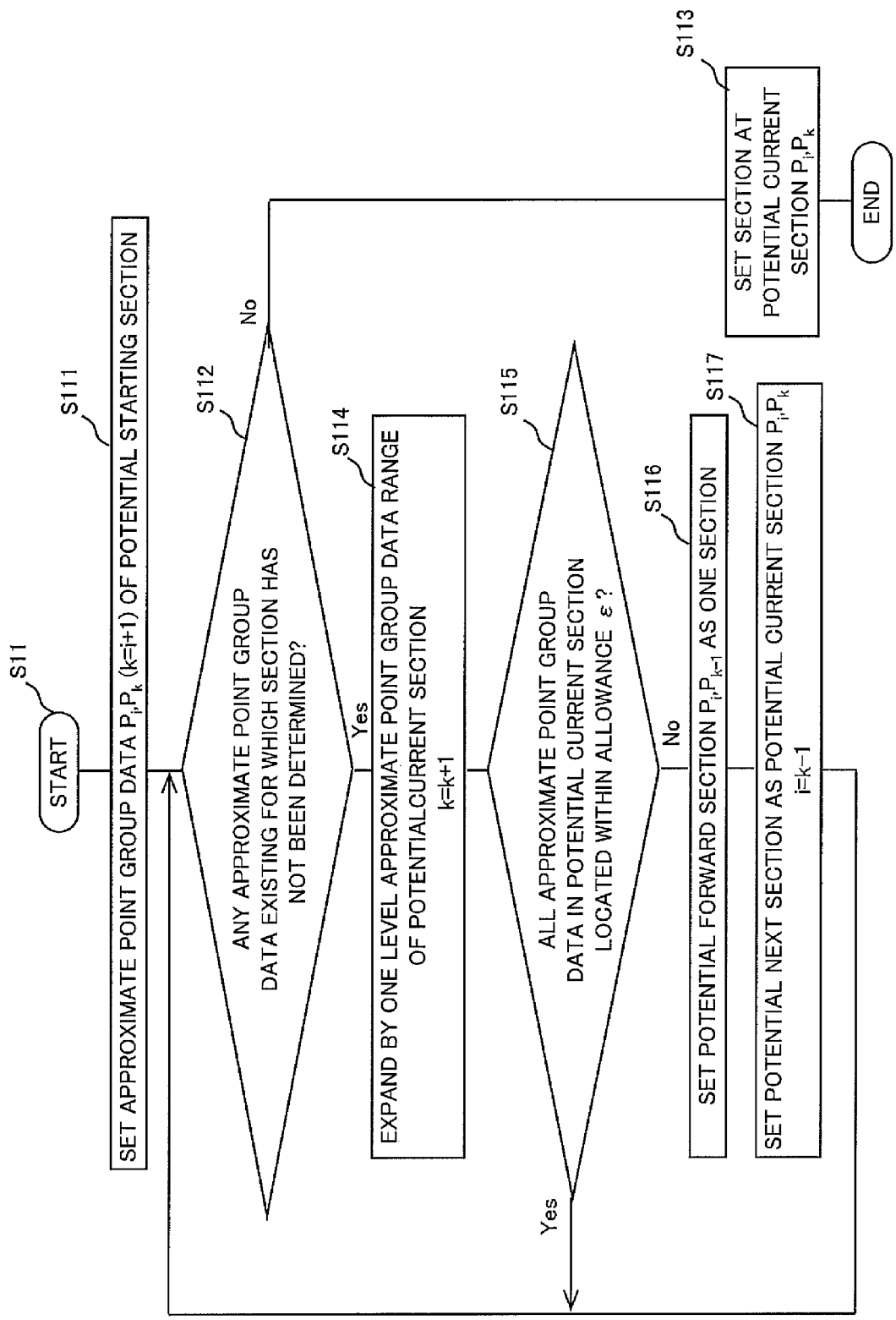
FIG. 3 is a flowchart of the operation in the approximate polygon shape range determining step according to the first and second embodiments of the present invention.
Figure 4:
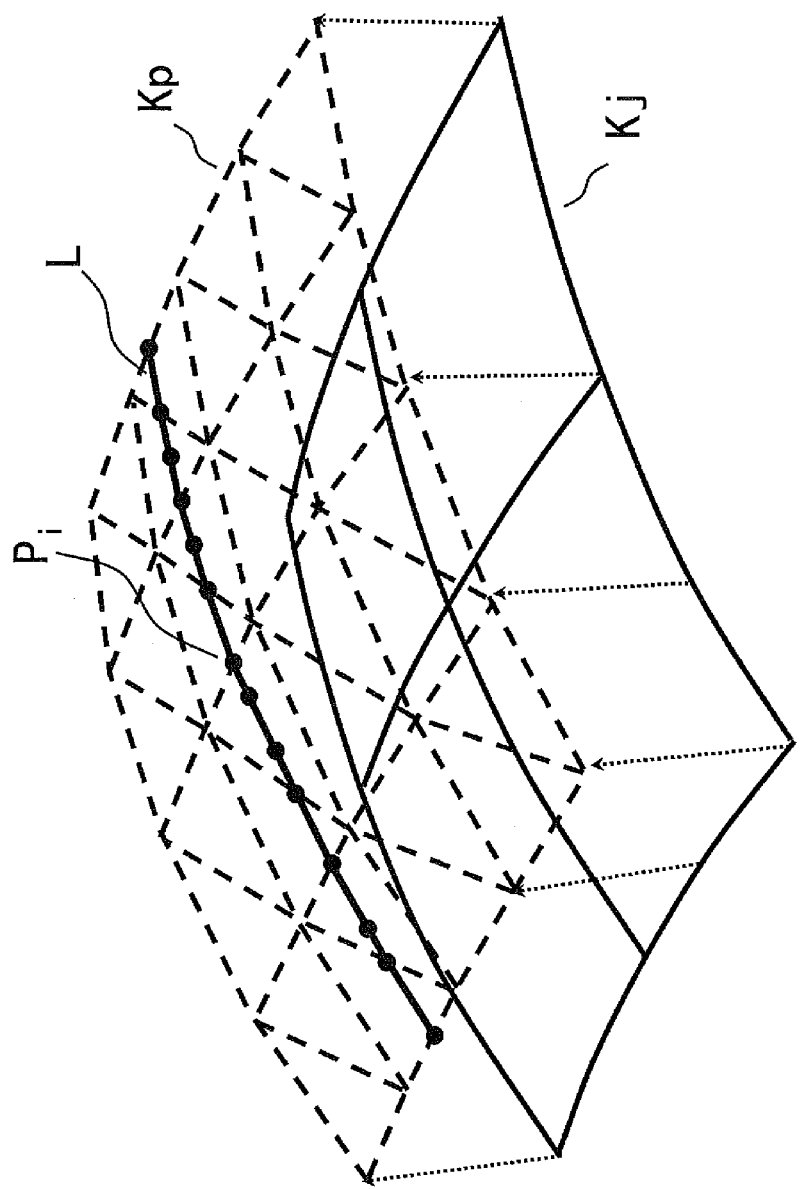
FIG. 4 is an explanatory view of an example of the problem to be solved by the present invention.

FIG. 3 is a flowchart showing an example of the detailed procedure of the approximate polygon shape range determining step S11 in the flowchart shown in FIG. 1 or 2.

First, in the approximate polygon shape range determining step S11, the first two pieces of point group data $P_i$ and $P_k$ (k=i+1) in the adjacent approximate point group data $P_i$, $P_{i+1}, \ldots, P_{i+n}$ are regarded in sequential order (step S111).

A determination is made as to whether or not there remain any approximate point group data that have not yet been section-determined (step S112). If there are no such approximate point group data, then the range $P_i, \ldots, P_k$ being regarded is set as one section, and the point group data around the section boundary are sorted as valid point group data, and the point group data inside the valid point group data are sequentially sorted as invalid point group data, thereby terminating the process (step S113).

If there still remain approximate point group data not yet having been section-determined, then the range of the approximate point group data being regarded is expanded, and the approximate point group data $P_i$ and $P_k$ (k=k+1) are regarded (step S114).

Then, a determination is made as to whether or not all surrounded approximate point group data $P_{i+1}, \ldots, P_{k-1}$ are located within a specified allowance from the line segment $L_i$: $P_i$ to $P_k$ connecting the two pieces of regarded approximate point group data (step S115). If all surrounded approximate point group data $P_{i+1}, \ldots, P_{k-1}$ are located within the allowance $\epsilon$, then control is returned to step S112 to expand the range of the regarded approximate point group data.

On the other hand, if any of the surrounded approximate point group data are not located within the allowance $\epsilon$, then the range $P_i$ to $P_{k-1}$ of the approximate point group data previously regarded is set as a section as existing on one approximate polygonal shape, and the point group data close to the section boundary are sequentially sorted as valid point group data and the point group data inside the valid point group data are sorted as invalid point group data (step S116).

When one section is determined, the next approximate piece of point group data $P_i$ (i=k−1) and $P_k$ are defined as candidates for the next section ranges (step S117). Then, control is returned to step S112, and all remaining approximate point group data are similarly processed.

As described above with reference to FIG. 3, in the approximate curve generation method according to the present invention, the approximate polygon shape range determining step may be a step where two pieces of point data in sequential order of the approximate point group data are regarded, and with the surrounded point group data all located within the allowance specified by the line segment connecting the two pieces of regarded point data, the range of the approximate polygonal shape is determined in the state in which the largest possible amount of surrounded point group data can be included, and in the range of the point group data, the regarded point data at both ends can be defined as valid point group data, and the remaining surrounded point group data can be defined as invalid point group data.

Described below is an example of a processing method of sorting the sectioned approximate point group data string $P_i$, $P_{i+1}, \ldots, P_{i+n}$ (n≧1) into invalid point group data $P_{i_j}$ and valid point group data $P_{e_j}$.

Figure 7:
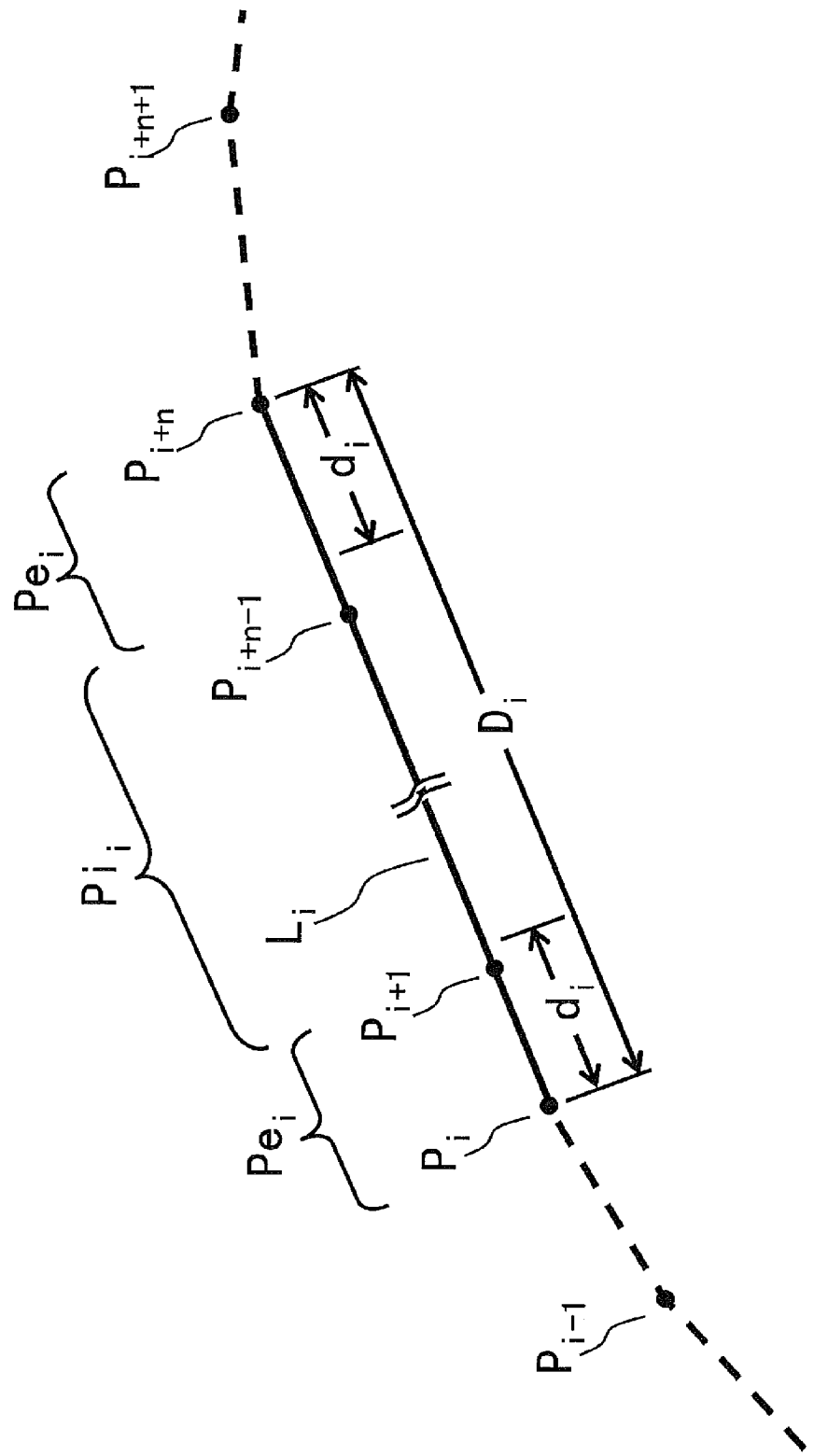
FIG. 7 is an explanatory view of the operation in the approximate polygon shape range determining step according to the first and second embodiments of the present invention.

As shown in FIG. 7, of the approximate point group data $P_i$, $P_{i+n}$ at both ends of the section and the surrounded approximate point group data $P_{i+1}, \ldots, P_{i+n-1}$, a determination is made as to whether the data are invalid point group data $P_{i_j}$ or valid point group data $P_{e_j}$, depending on whether or not the data are distant from the regarded approximate point group data $P_i$, $P_{i+n}$ on both sides by the determination distance $d_i = D_i \times K$ or larger of the ratio K specified based on the length $D_i$ of the straight line segment $L_i$: $P_i$ to $P_{i+n}$ connecting the regarded approximate point group data on both ends. Without specifying the ratio K, the determination distance $d_i$ can be directly specified.

As described above with reference to FIG. 7, in the approximate curve generation method according to the present invention, the approximate polygon shape range determining step may be a step wherein two pieces of point data in a sequential order among the approximate point group data are regarded, with the surrounded point group data all located within a specified allowance from the line segment connecting the two pieces of regarded point data, the range of the approximate polygonal shape is determined in a state in which the largest possible amount of surrounded point group data can be included, and in the range of the point group data, a determination can be made as to whether the data are invalid point group data or valid point group data, depending on whether or not the data are distant from the regarded point data at both ends by the determination distance or larger of the ratio specified based on the interval of the line segment connecting the regarded point data on both ends. Otherwise, in the approximate curve generation method according to the present invention, the approximate polygon shape range determining step may be a step wherein two pieces of point data in sequential order of the approximate point group data are regarded, with the surrounded point group data all located within a specified allowance from the line segment connecting the two pieces of regarded point data, the range of the approximate polygonal shape is determined in the state in which the largest possible amount of surrounded point group data can be included, and in the range of the point group data, a determination can be made as to whether or not the data are invalid point group data or valid point group data, depending on whether or not the distance from the regarded point data on both ends is equal to or larger than a specified determination value.

In the point group data correcting step S23 in the flowchart shown in FIG. 2, an example of the invalid point group data selection method of generating corrected point group data by moving data toward the correction curve $Cr_i$ can be as follows.

Figure 8:
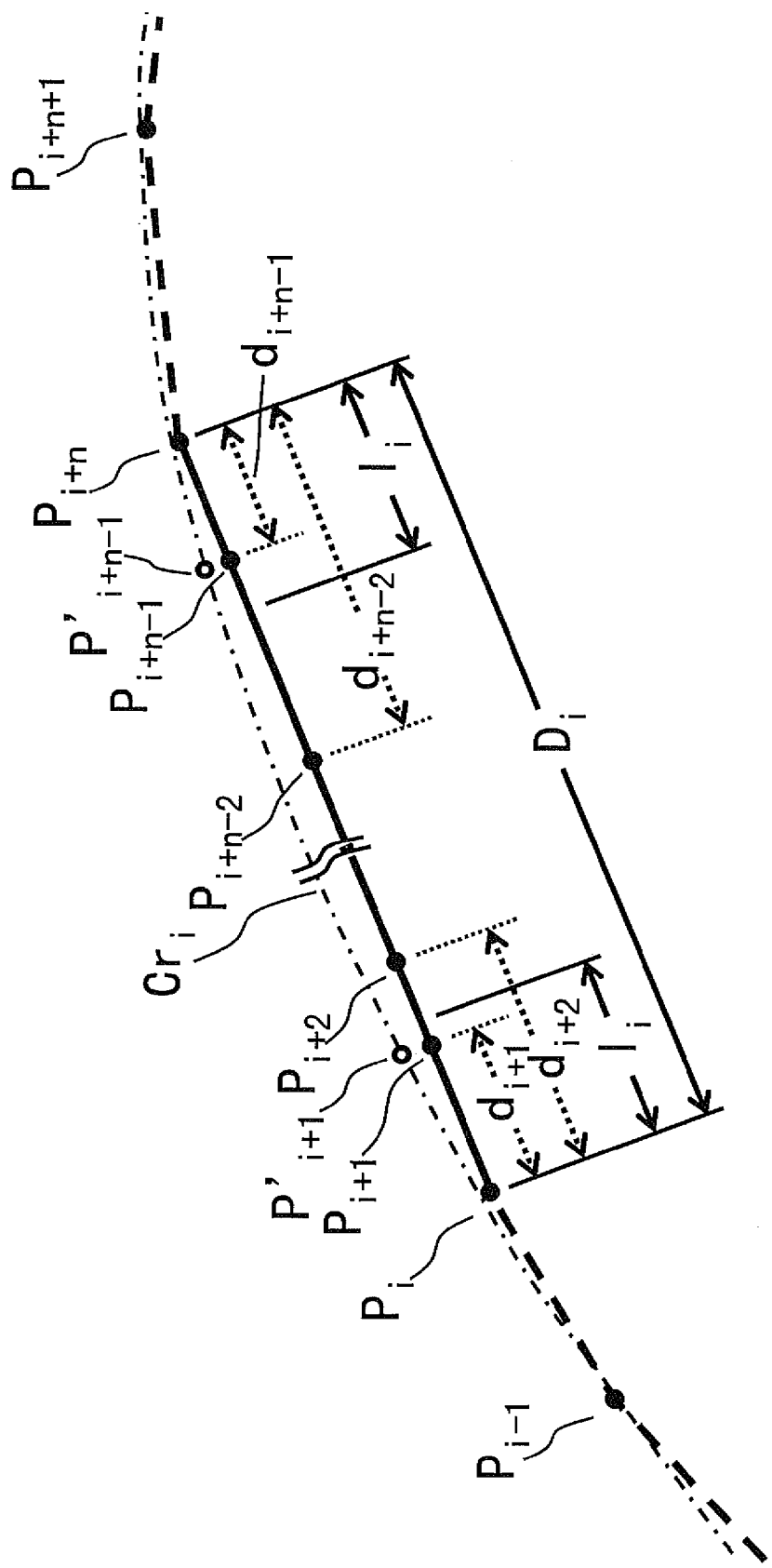
FIG. 8 is an explanatory view of the operation in the point group data correcting step according to the second embodiment of the present invention.

As shown in FIG. 8, the selecting method generates corrected point group data $P'_{i+1}$, $P'_{i+n-1}$ from only invalid point group data $P_{i+1}$, $P_{i+n-1}$ whose interval $d_{i+1}$, $d_{i+2}$, ..., $d_{i+n-2}$, $d_{i+n-1}$ from each of the invalid point group data $Pi_i$: $P_{i+1}$, $P_{i+2}$, ..., $P_{i+n-2}$, $P_{i+n-1}$, to the surrounding valid point group data $Pe_i$: $P_i$ or $P_{i+n}$ is within the selection distance $1_i = D_i \times Kr$ which is specified by the ratio Kr, a value based on the interval $D_i$, wherein the interval $D_i$ is the interval of a segment of the range of the approximate polygonal shape and is the interval from the valid point group data $P_i$ to $P_{i+n}$ which surround the invalid point group data.

As described above with reference to FIG. 8, in the approximate curve generation method according to an aspect of the present invention, the point group data correcting step may include a selecting step of the invalid point group data to be moved toward the correction curve to generate corrected point group data, the selecting depending on whether or not the invalid point group data as a candidate for correction exists from valid point group data surrounding before or after the invalid point group data within a distance specified at a ratio which is based on an interval between the regarded valid point group data surrounding the invalid point group data.

In addition, in the point group data correcting step S23 in the flowchart shown in FIG. 2, another example of the method of selecting invalid point group data for generation of the corrected point group data by moving data toward the correction curve $Cr_i$ can be as follows.

Figure 9:
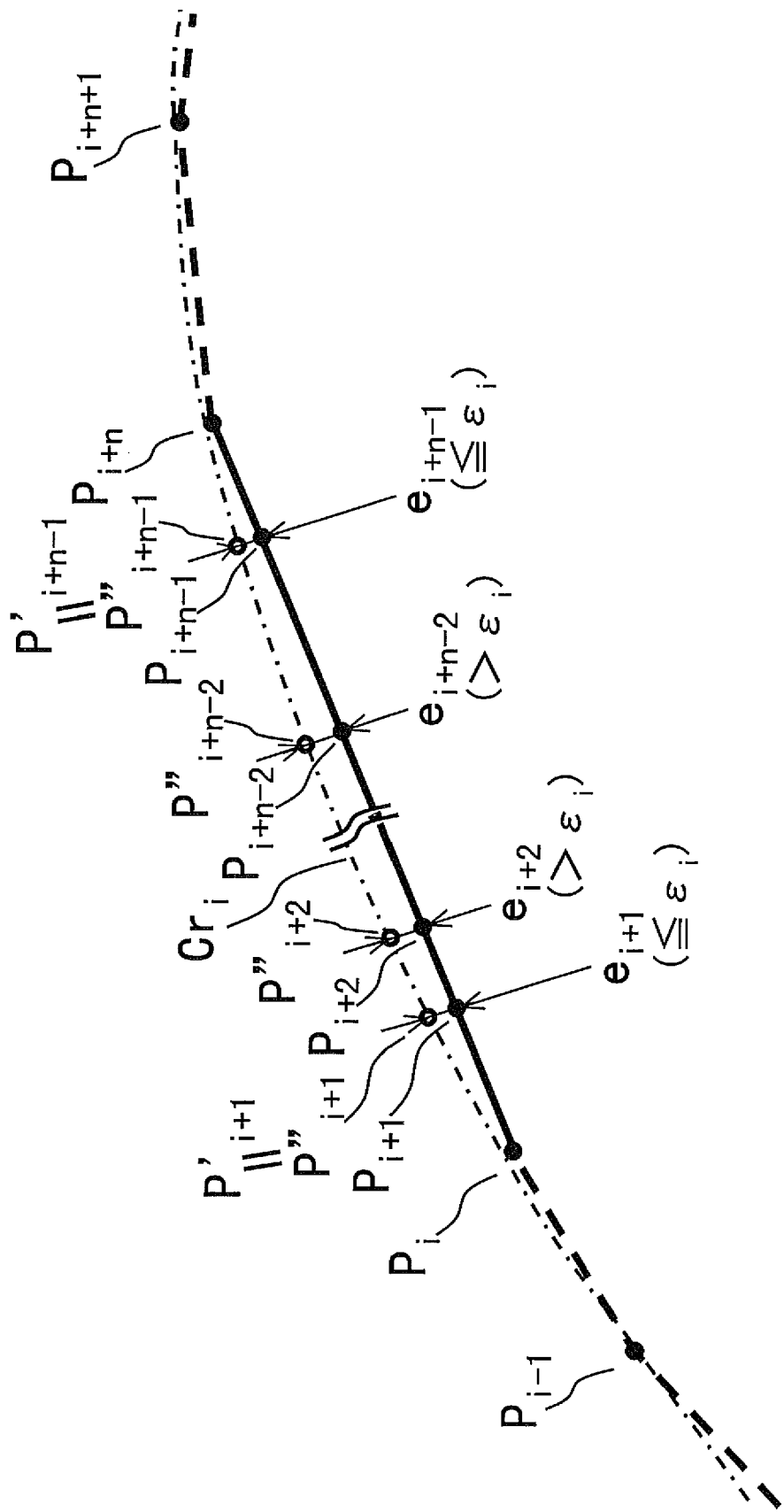
FIG. 9 is an explanatory view of the operation in the point group data correcting step according to the second embodiment of the present invention.

As shown in FIG. 9, the selecting method generates corrected point group data $P'_{i+1}$ ($=P''_{i+1}$), $P'_{i+n-1}$ ($=P''_{i+n-1}$) from only the invalid point group data $P_{i+1}$, $P_{i+n-1}$ whose travel distance $e_{i+1}$, $e_{i+2}$, ..., $e_{i+n-2}$, $e_{i+n-1}$ from each of the pieces of invalid point group data $Pi_i$: $P_{i+1}$, $P_{i+2}$, ..., $P_{i+n-2}$, $P_{i+n-1}$ as candidates for correction to the candidate for the corrected point group data $P''_{i+1}$, $P''_{i+2}$, ..., $P''_{i+n-2}$, $P''_{i+n-1}$ generated from the invalid point group data is within the reference distance $\epsilon_i$.

As described above with reference to FIG. 9, in the approximate curve generation method according to an aspect of the present invention, the point group data correcting step may include a selecting step of the invalid point group data to be moved toward the correction curve to generate corrected point group data, the selecting depending on whether or not a travel distance from the invalid point group data as a candidate for correction to corrected point group data generated from the invalid point group data is within a specified reference distance.

In the approximate curve generation method according to the above-mentioned embodiments of the present invention, an approximate curve and a correction curve are generated from only the point group data $P_i$ or corrected point group data sufficiently close to the ideal offset shape Ko, and thereby an approximate curve closer to the curvature and the smoothness of the ideal offset shape Ko can be generated. Also, by using the approximate curve generation method according to the above-mentioned embodiments of the present invention, a smooth approximate curve closer to the curve shape on the original ideal offset shape Ko can be generated without increasing a load imposed on an apparatus for the CAD/CAM or the amount of data to accommodate more accurate work.

Although the method described above is to generate an approximate curve as smooth as the original curve from the point group data approximated by minute line segments from an original curve shape, the approximate polygon shape range determining step according to the present invention can be expanded to a process step by dividing point group data approximated from an original curved surface shape for each plane of approximate polygon shape generated when the point group data are obtained, and sorting the point group data around the section boundary as valid point group data and the point group data inside the valid point group data as invalid point group data. The expansion provides an advantage of the present invention by generating a smooth approximate curve as the original sectional curve from the point group data indicating a curved surface shape approximated by minute line segments.

Figure 10:
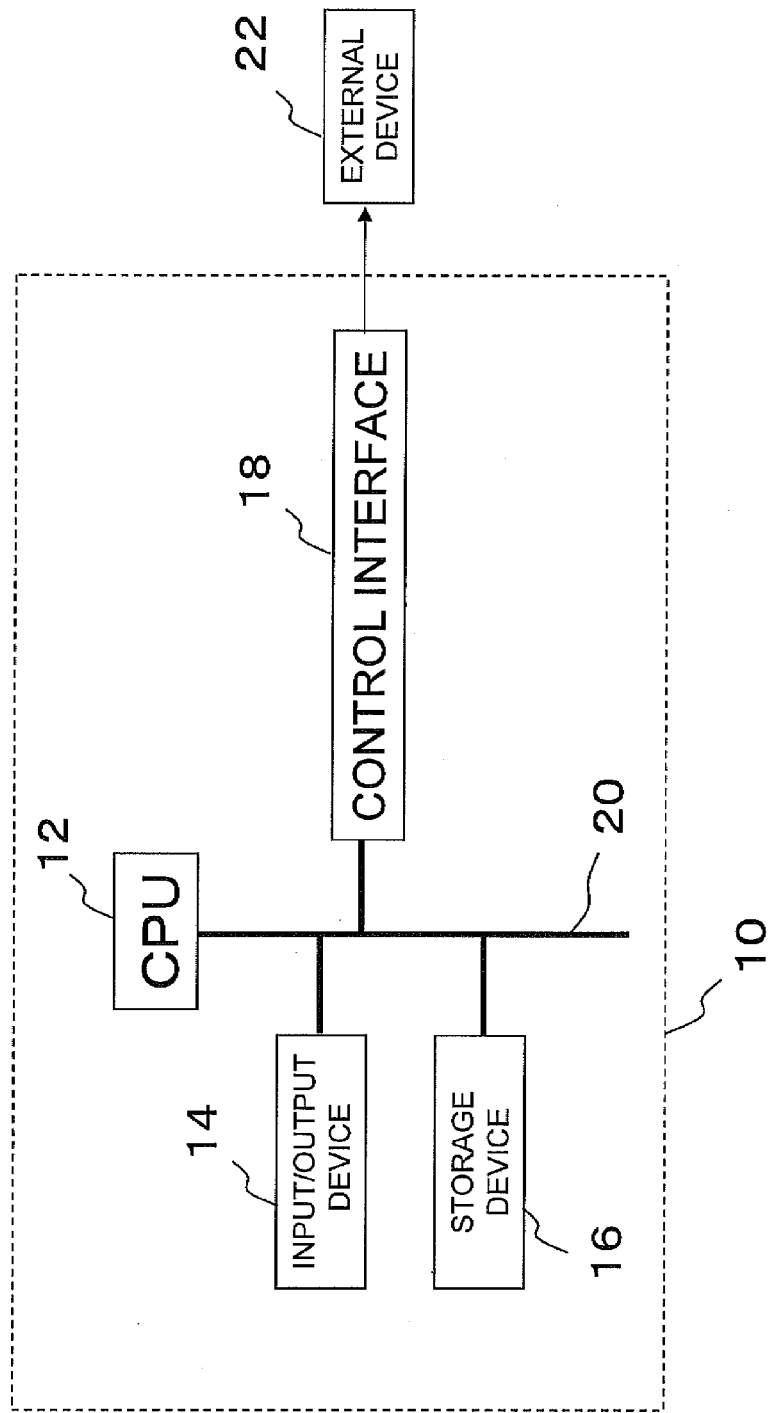
FIG. 10 shows an example of the configuration of the NC apparatus capable of executing the program according to the present invention.

FIG. 10 shows an example of the configuration of the NC apparatus capable of executing the program according to the present invention. An NC apparatus 10 has a configuration in which a CPU (central processing unit) 12, an input/output device 14, a storage device 16, and a control interface 18 are interconnected via a bus 20. The CPU 12 performs an arithmetic operation required in the process to be performed by the NC apparatus 10. The input/output device 14 receives input from a user, and outputs a process result of the NC apparatus 10. The storage device 16 stores information such as point group data required in the process by the NC apparatus 10 and a program describing the procedure of the process. The control interface 18 is connected to an external device 22 such as a machine tool, and controls the travel of each drive axis of the external device 22 on the basis of a result of the process performed by the NC apparatus 10. For example, the program describing the step of the approximate curve generation method in the flowchart shown in FIG. 1 or 2 is stored in the storage device 16, and the CPU 12 calls up and executes the program, thereby holding the coordinates of the point group data in the storage device 16 to perform the above computation, and controlling the travel of each drive axis of the external device 22 connected to the NC apparatus 10 through the control interface 18 by reference to the generated approximate curve.

What is claimed is:

1. A computer-readable recording medium storing an approximate curve generation program, the approximate curve generation program being used to direct a computer to perform steps comprising:

sectioning point group data into sections each of which corresponding to each line segment of an approximate polygon shape which is generated when the point group data approximating a curve shape are obtained, and sorting the point group data close to a section boundary as valid point group data, and the point group data inside the valid point group data as invalid point group data; and generating an approximate curve, using only the valid point group data said approximate curve passing through or close to the valid point group data, wherein the approximate curve being as smooth as an original curve being generated from the point group data and provided as transfer command data in an NC program used in an NC apparatus for controlling transfer of each drive axis of a machine, the point group data being obtained by approximating the curve shape as an original transfer shape by minute line segments.

2. The computer-readable recording medium according to claim 1, wherein the step of sectioning the point group data comprises providing two pieces of point data in a sequential order among approximating point group data, with surrounded point group data all located within a specified allowance from the line segment connecting the two pieces of the point data, determining the range of the approximate polygonal shape in a state in which a largest possible amount of the surrounded point group data can be included, and in the range of the point group data, determining the point data at both ends as the valid point group data, and determining the remaining surrounded point group data as the invalid point group data.

3. The computer-readable recording medium according to claim 1, wherein the step of sectioning the point group data comprises providing two pieces of point data in a sequential order of approximating point group data, with surrounded point group data all located within a specified allowance from the line segment connecting the two pieces of the point data, determining the range of the approximate polygonal shape in a state in which a largest possible amount of the surrounded point group data can be included, and in the range of the point group data, determining whether or not the data are the invalid point group data or the valid point group data, depending on whether or not a distance from the point data on both ends is equal to or larger than a specified determination value.

4. The computer-readable recording medium according to claim 1, wherein the step of sectioning the point group data comprises providing two pieces of point data in a sequential order among approximating point group data, and determining, with surrounded point group data all located within a specified allowance from the line segment connecting the two pieces of the point data, determining the range of the approximate polygonal shape in a state in which a largest possible amount of the surrounded point group data can be included, and determine, in the range of the point group data, whether the data are the invalid point group data or the valid point group data depending on whether or not the data are distant from the point data at both ends by a determination distance or larger of a ratio which is specified based on an interval of the line segment connecting the point data on both ends.

5. A computer-readable recording medium storing an approximate curve generation program, the approximate curve generation program being used to direct a computer to perform steps comprising:
sectioning point group data into sections of which corresponding to each line segment of an approximate polygon shape which is generated when the point group data approximating a curve shape are obtained, and sorting the point group data close to a section boundary as valid point group data, and the point group data inside the valid point group data as invalid point group data
selecting a second point group data to be associated with a correction curve using only the valid point group data, selecting a portion of the valid point group data and a specified number of the valid point group data before and after the portion of the valid point group data as the second point group data;
generating a smooth correction curve passing through or close to the second point group data to be associated with the correction curve;
moving the valid point group data and each piece of the invalid point group data surrounded by the valid point group data toward the smooth correction curve, and the moved valid point group data are defined as corrected point group data;
generating an approximate curve passing through or close to the corrected point group data, wherein
the approximate curve being as smooth as an original curve being generated from the point group data and provided as transfer command data in an NC program used in an NC apparatus for controlling transfer of each drive axis of a machine, the point group data being obtained by approximating the curve shape as an original transfer shape by minute line segments.

6. The computer-readable recording medium according to claim 5, wherein the step of sectioning the point group data providing two pieces of point data in a sequential order among approximating point group data, with surrounded point group data all located within a specified allowance from the line segment connecting the two pieces of the point data, determining the range of the approximate polygonal shape in a state in which a largest possible amount of surrounded point group data can be included, and in the range of the point group data, determining the point data at both ends as the valid point group data, and determining remaining surrounded point group data as the invalid point group data.

7. The computer-readable recording medium according to claim 5, wherein the step of sectioning the point group data comprises providing two pieces of point data in a sequential order among approximating point group data, and determining, with surrounded point group data all located within a specified allowance from the line segment connecting the two pieces of the point data, determining the range of the approximate polygonal shape in a state in which a largest possible amount of the surrounded point group data can be included, and determine, in the range of the point group data, whether the data are the invalid point group data or the valid point group data depending on whether or not the data are distant from the point data at both ends by a determination distance or larger of a ratio which is specified based on an interval of the line segment connecting the point data on both ends.

8. The computer-readable recording medium according to claim 5, wherein the step of sectioning the point group data comprises providing two pieces of point data in a sequential order of approximating point group data, with surrounded point group data all located within a specified allowance from the line segment connecting the two pieces of the point data, determining the range of the approximate polygonal shape in a state in which a largest possible amount of the surrounded point group data can be included, and in the range of the point group data, determining whether or not the data are the invalid point group data or the valid point group data, depending on whether or not a distance from the point data on both ends is equal to or larger than a specified determination value.

9. The computer-readable recording medium according to claim 5, wherein the step of generating the approximate curve comprises selecting the invalid point group data to be moved toward the correction curve to generate the corrected point group data depending on whether or not the invalid point group data as a candidate for correction exists from the valid point group data surrounding before or after the invalid point group data within a distance specified at a ratio which is based on an interval between the valid point group data surrounding the invalid point group data.

10. The computer-readable recording medium according to claim 5, wherein the step of generating the approximate curve comprises selecting the invalid point group data to be moved toward the correction curve to generate corrected point group data depending on whether or not a travel distance from the invalid point group data as a candidate for correction to the corrected point group data generated from the invalid point group data is within a specified reference distance.

11. An approximate curve generation method, comprising:
sectioning point group data into sections each of which corresponding to each line segment of an approximate polygon shape which is generated when the point group data approximating a curve shape are obtained, and sorting the point group data close to a section boundary as valid point group data, and the point group data inside the valid point group data as invalid point group data; and generating an approximate curve using only the valid point group data, said approximate curve passing through or close to the valid point group data, wherein the approximate curve being as smooth as an original curve being generated from the point group data and provided as transfer command data in an NC program used in an NC apparatus for controlling transfer of each drive axis of a machine, the point group data being obtained by approximating the curve shape as an original transfer shape by minute line segments.

* * * * *